(No Model.) 5 Sheets—Sheet 1.

E. V. BEALS.
APPARATUS FOR PERFORATING STRIPS FOR ACTUATING TYPE RINGS.

No. 509,860. Patented Dec. 5, 1893.

FIG. 1.

WITNESSES:
W. H. Pumphrey
Chas. E. Brock

INVENTOR
E. V. Beals
BY William Webster
his ATTORNEY.

(No Model.) 5 Sheets—Sheet 2.
E. V. BEALS.
APPARATUS FOR PERFORATING STRIPS FOR ACTUATING TYPE RINGS.
No. 509,860. Patented Dec. 5, 1893.

(No Model.) 5 Sheets—Sheet 3.
E. V. BEALS.
APPARATUS FOR PERFORATING STRIPS FOR ACTUATING TYPE RINGS.
No. 509,860. Patented Dec. 5, 1893.

WITNESSES
Carroll J. Webster
Grace E. Lehaney

INVENTOR
Erle V. Beals
By William Webster
Atty (No Model.) 5 Sheets—Sheet 4.

E. V. BEALS.
APPARATUS FOR PERFORATING STRIPS FOR ACTUATING TYPE RINGS.

No. 509,860. Patented Dec. 5, 1893.

WITNESSES
Carroll J. Webster
Frace E. Lehaney

INVENTOR.
Earle V Beals
By William Webster
Atty

UNITED STATES PATENT OFFICE.

ERLE V. BEALS, OF DETROIT, MICHIGAN.

APPARATUS FOR PERFORATING STRIPS FOR ACTUATING TYPE-RINGS.

SPECIFICATION forming part of Letters Patent No. 509,860, dated December 5, 1893.

Original application filed May 18, 1891, Serial No. 393,109. Divided and this application filed March 25, 1892. Serial No. 426,359. (No model.)

*To all whom it may concern:*

Be it known that I, ERLE V. BEALS, of Detroit, county of Wayne, and State of Michigan, have invented certain new and useful Improvements in Apparatus for Perforating Strips for Actuating Type-Rings; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates generally to perforating machines and more particularly to a machine designed to perforate a strip of paper adapted for employment in my matrix making machine, the application for which was filed May 18, 1891, Serial No. 393,109, and of which this application is a divisional portion. The strip however, prepared by this perforator may also be used in other matrix making machines whose operations are similar to mine.

My matrix making machine consists essentially of an assembling device, composed of a series of type carrying rings, each of which is under the control of an electric magnet and a reeling device, carrying a strip of perforated paper which makes and breaks the current controlling the magnets, and thus regulates the action of the type carrying rings. In this matrix making machine there are as many type carrying rings as there are letters in a line of composition and each ring contains the alphabet, numerals, &c. The matrix making machine is so constructed and operates in such a manner that all similar characters to be used in the line of composition are selected simultaneously through the coaction of the paper reeling device and electric magnets, and all the different characters are finally brought into alignment at the completion of each line of composition. In order to accomplish this operation, it is essential that the perforated strip should be prepared in a definite manner, and it is with the object of quickly and accurately preparing this strip that I have constructed this perforating machine.

A further object of my invention is to provide a machine of this character that will be simple and cheap in construction, easily manipulated, and thoroughly efficient in operation.

A further object of my invention is to economize in the use of paper which is to be perforated.

A further object is to provide a machine in which the paper that has been perforated will be moved out of the frame by the same operation that returns the parts to their normal positions, ready to perforate a second line of composition.

With these various objects in view my invention consists in the peculiar construction of the several parts and their novel combination or arrangement, all of which will be fully described and claimed.

In the drawings forming a part of this specification, Fig. 13, is a detail perspective view showing the supplemental punch bar, operating cams, the grooved cylinder, and the finger on the main punch bar working in said cylinder.

Figure 1:
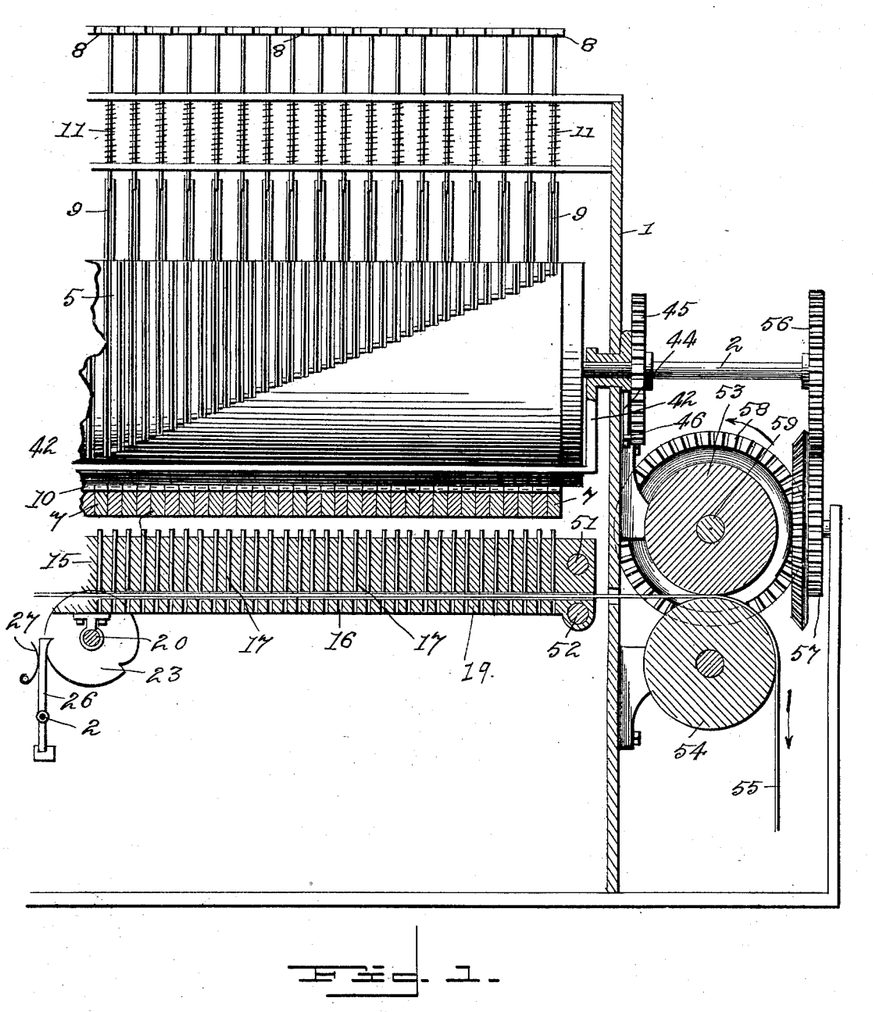
Figure 1 is a vertical longitudinal section of the rear portion of my machine, the gage plate and rings being shown in side elevation.
Figures 2, 6:
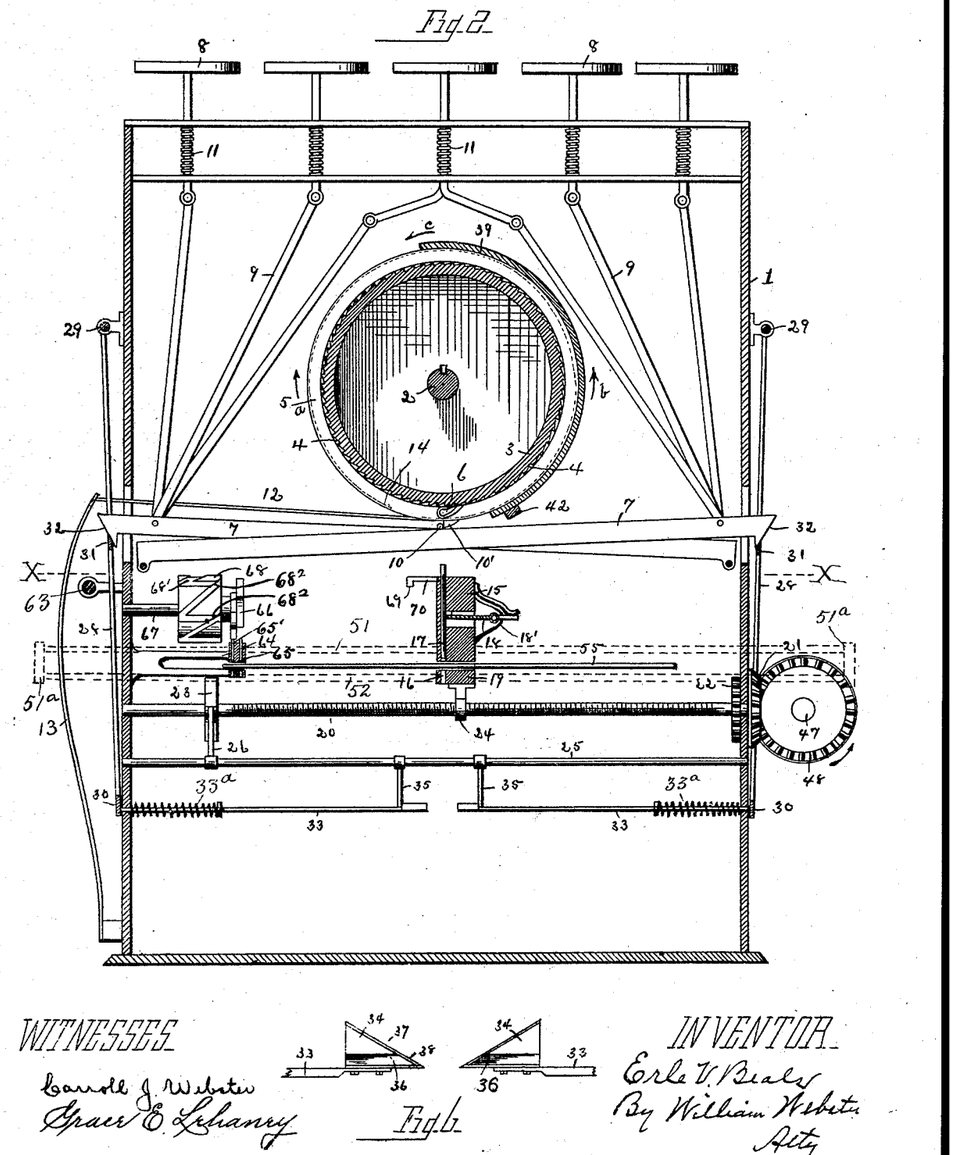
Fig. 2, is a transverse vertical section.
Fig. 6, is a detail view showing the blocks 34 for operating the arms 35.

In carrying out my invention I employ a frame or casing 1, essentially rectangular in shape, and within the same I arrange a punch carrying bar longitudinally of the frame and composed of the upper section 15 and the lower section 19, supported upon the transverse, parallel rods 51 and 52 respectively, which rods are arranged in vertical alignment and slide in the sides of the frame near the opposite ends of the same. The sections of the punch bar are separated sufficiently to permit a strip of paper 55, (Figs. 1 and 2) being passed between them, and as it is necessary that these sections should always move in unison, I connect the ends of the rods 51 and 52 outside the frame by means of connecting rods 51ª (Fig. 2). The end rods are united outside the frame to allow the lateral movements of the punch bar and rods when the machine is operated. The upper section 15 of the punch bar is provided with a series of vertical bores 16, and in each bore is arranged a punch 17. The lower section 19 is also provided with bores 16 to receive the ends of the punches as they are pressed through the paper strips 55. The punches 17 are normally held in a raised position by means of a spring pressed plate 18, which is pivoted to one side of the section 15, and bears beneath a lateral projection arranged upon each punch as most clearly shown in Fig. 2. The punch carrying bar extends from one end of the frame to the other, and carries as many punches as there are characters in composition. The strip of paper 55, is passed longitudinally between the sections of the punch carrying bar, and remains stationary within the machine while a line of composition is being perforated as hereinafter described.

In order to operate the punches and force them through the paper, I provide a series of punch levers 7 pivoted alternately upon the opposite interior sides of the frame 1, each lever being arranged to strike one particular punch, 17, and no other. These levers, 7, are pivoted at one end and free at the other, and to the free end is attached the rod, 9, (Fig. 2) which in turn is connected with the key 8, (Figs. 1 and 2.) These keys are arranged upon the upper side of the frame and are provided with springs to return them to their normal positions after being once depressed, thus raising the punch lever 7 from the top of punch 17. The keys 8, are also arranged with reference to the frequency with which they are used, those most frequently used being arranged at or near the rear end of machine, while those carrying the character least frequently used are arranged at or near the forward end of the frame. This arrangement of the keys is made for the purpose of saving the paper which is fed to the machine, as the mechanism is so constructed as to pass from the machine only such length of paper as has been perforated, as will appear hereinafter.

Figures 7, 12:
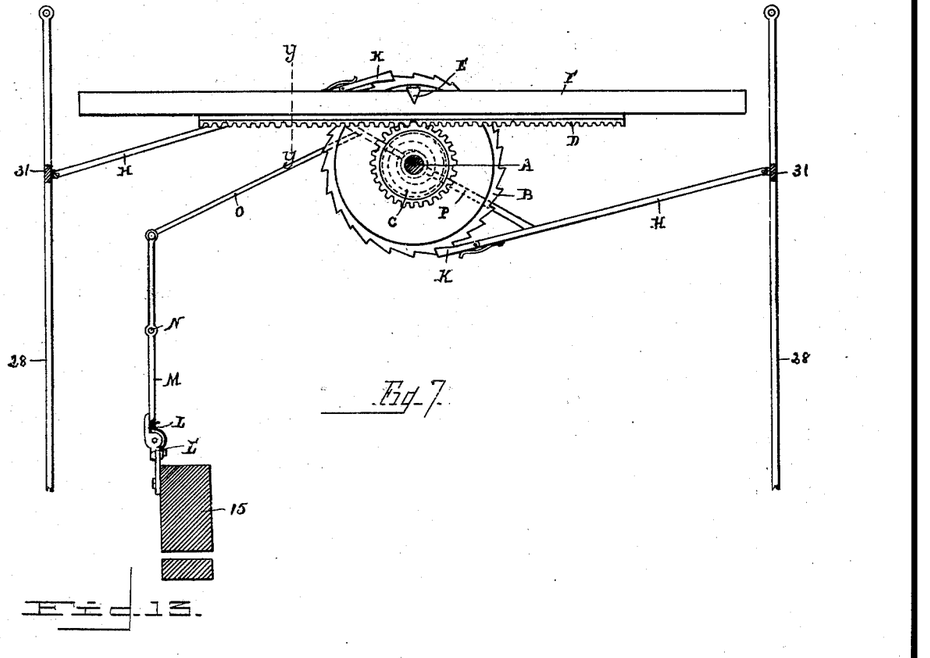
Fig. 7, is a face view of the registering mechanism.
Fig. 12, is a detail view illustrating a sheet of the perforated paper after it has been passed through the machine.

The perforations are made in the paper in such a manner that all similar characters are produced upon the same transverse line, while the relative position with regard to the other characters is determined by the longitudinal line on which it is produced, and by referring to Fig. 12 it will be seen that while several perforations appear in transverse alignment there are no perforations in longitudinal alignment. In order to perforate the paper in this manner, I gradually move the punch bar transversely across the face of the strip which remains stationary, the bar moving a short distance after each perforation is made, and after a line of composition has been perforated the punch bar is moved back the distance it has been moved forward at the same time that the strip is fed out only the distance for which it has been perforated, thus equalizing all movements of the mechanism, and economizing in paper fed to the machine.

Figure 3:
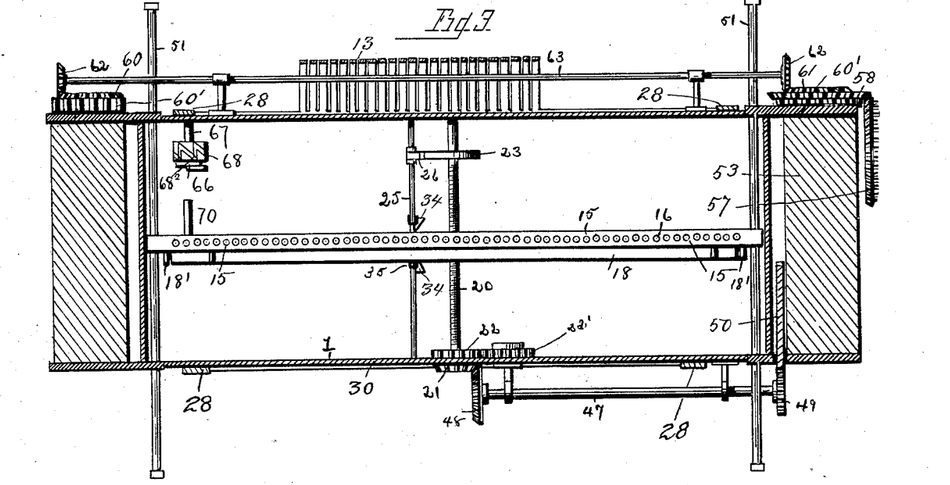
Fig. 3, is a horizontal section on line $x-x$ of Fig. 2.
Figure 4:
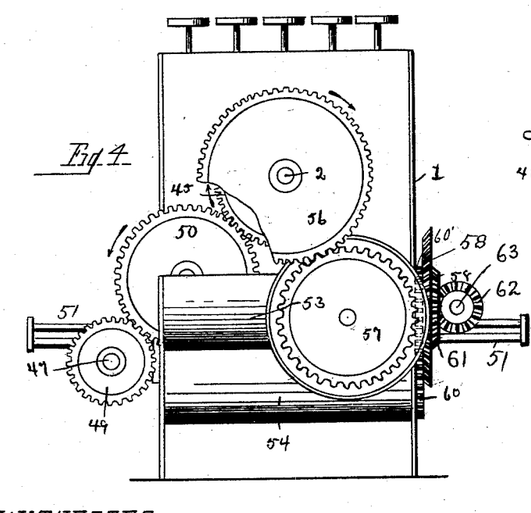
Fig. 4, is a rear view of the machine.
Figure 5:
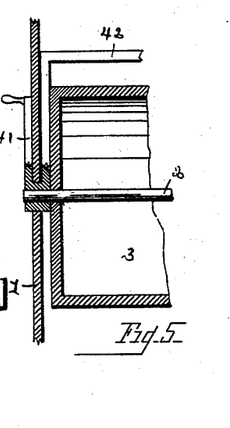
Fig. 5, is a detail view of the forward end of cylinder.
Figures 10, 11, 12:
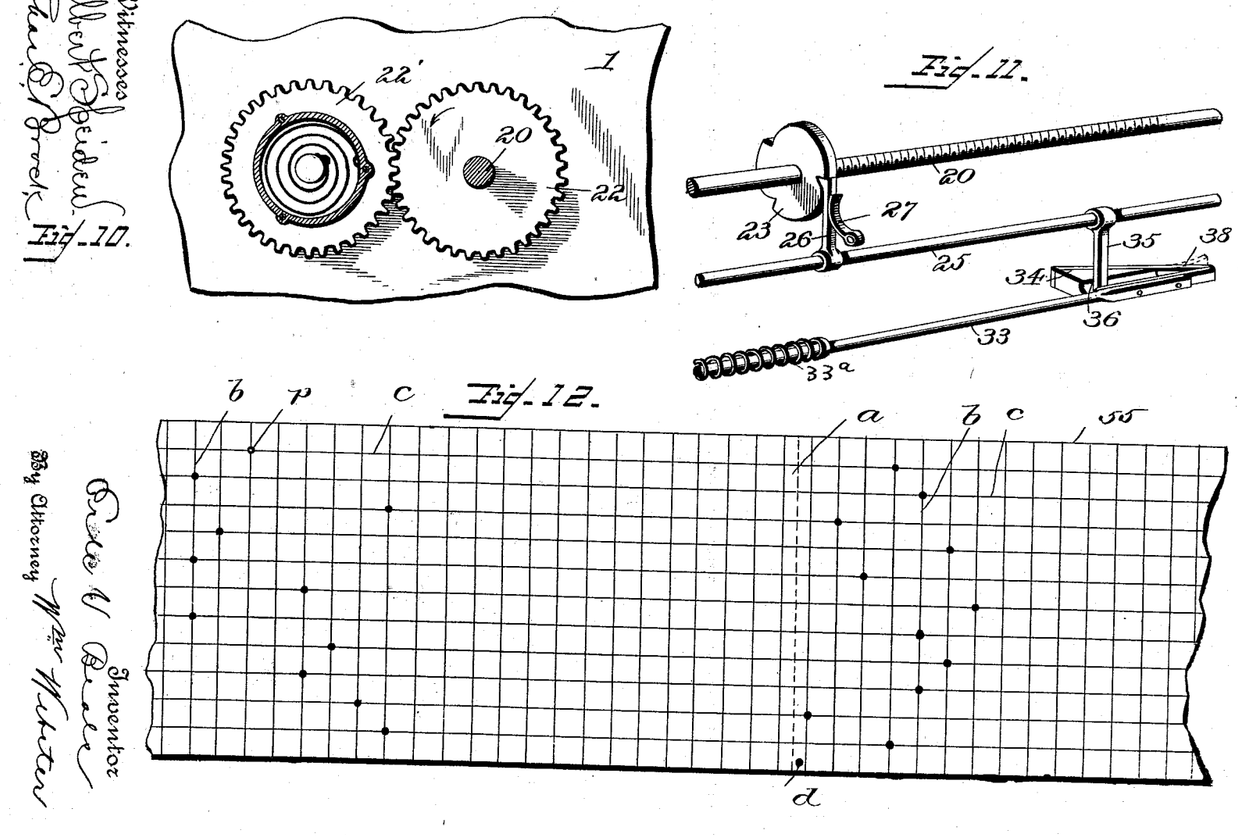
Fig. 10, is a detail view of the spring actuated pinion and mating gear for operating the feed shaft.
Fig. 11, is a detail perspective view of the feed shaft and the locking and releasing mechanism.

For the purpose of moving the punch bar from one side of frame to the other, I provide a threaded shaft 20, (Figs. 1, 2, and 3) journaled transversely within the frame, and beneath the punch bar, said shaft carrying a traveler nut 24, which is rigidly connected with the lower section of the punch bar as most clearly shown in Figs. 1 and 2. A pinion 22 is mounted upon the shaft 20 within the frame and upon the end of shaft outside the frame is mounted a bevel gear 21, (Figs. 2 and 3.) The pinion 22 meshes with a pinion 22' (Figs. 3 and 10) having a case spring which operates the same. The tendency of the spring actuated pinion 22' is to drive the shaft 20 in such a direction that the punch bar will be moved from the right side of frame to the left through the medium of the traveler nut 24; and this tendency of the spring pinion 22' is resisted or checked by means of a pawl 26, (Figs. 1 and 2) rigid upon a rock shaft 25; and engaging a ratchet disk 23 mounted upon the shaft 20, said pawl being held in engagement by a spring 27, (Fig. 1) so that, as long as the pawl engages the ratchet disk the shaft remains stationary and consequently the punch carrying bar. This punch carrying bar, however, must move transversely a uniform distance after each perforation has been made, and to accomplish this, I provide the rock shaft 25, journaled in the sides of the frame below the shaft 20, and parallel therewith, and near the center of said shaft 25, provide the same with the pendent arms 35, 35 (Fig. 2). Vertical bars 28 are hinged upon the exterior of each side of the frame at 29, (Fig. 2) said bars being connected at their lower ends by means of the lower cross bars 30, and near their central portions by means of the central cross bars 31, (Fig. 2.) Horizontal rods 33, project inwardly through the sides of the frame beneath the shaft 25 and parallel therewith, their outer ends being hinged to the lower cross bars 30, while at their inner ends are secured triangular shaped blocks 34, (Figs. 2, 6, and 11.) These blocks 34, are each formed with a groove 36, adjacent to the bar 33, and upon the inclined face 37 of each block is secured a spring plate 38, said plate being secured at one end only, and free at the end adjacent to the groove 36. The pendent arms 35 are adapted to rest in the grooves 36 of their respective blocks. The free end of each punch lever projects a short distance through the side of the frame and is provided with an oblique head 32, (Fig. 2) which is intended to ride upon the inclined edge of the adjacent central cross bar 31. By means of the mechanism just described (Fig. 2) when any key is depressed the punch lever strikes its respective punch and makes a perforation. At the same time, the oblique head 32 rides upon the bar 31, forcing the bars 28 and 30 outward, which in turn draws the rod 32 outward, and as this is done the arm 35 slides out of the groove 36 of the adjacent block 34, pressing the spring plate 38, back, and as soon as the arm 35 escapes from the groove the plate springs into its normal position. A single perforation has now been produced and the punch bar remains stationary. As soon however as the key is released it springs up, carrying with it the punch lever, 7, and all pressure being released from bar 31, the spring 33ª, (Figs. 2 and 11) upon the rod 33 forces the same inward, and the inclined face 37 of block 34 contacts with its respective arm 35 which has previously escaped from the groove in the block. This movement of the block upon the arm rocks the shaft 25 which throws the pawl 26 out of engagement with disk 23, and all resistance being now removed for an instant, the spring pinion 22' through pinion 22, will cause the shaft 20 to turn until the next tooth of disk 23 is brought into engagement with pawl 26. This disk is preferably constructed with three teeth as shown in Fig. 1. In this manner the punch bar is moved a uniform distance from right to left after each perforation has been made, and what has been said in regard to operating one key and punch lever is true as to all of them, the mechanism on each side being similar, owing to the fact that the punch levers are pivoted alternately upon the opposite interior sides of the frame. It will also be observed that as the punch carrying bar moves transversely but not longitudinally, and that as the paper is held stationary within the punch bar while being perforated; it must follow that all like characters are made upon the same transverse line, while their relative position in its line of composition is determinable from the longitudinal line and this arrangement of the perforations is essential to the perfect working of my matrix making machine. The paper after being prepared is placed upon a reel, constituting a part of my matrix making machine, and bearing upon this paper thus placed on the reel, is a series of electric needles, each one of which is connected with a different type carrying ring, and controls the same through an electric magnet. The rings are arranged in regular order within the machine there being as many as there are characters in a line of composition, and each ring carries the alphabet, numerals, &c. Now as the paper is reeled beneath the electric needles, the current is closed at each perforation, thus selecting a type from the ring with which that needle is connected, and what that character is, depends entirely upon which transverse line it is made on, while the ring it is selected from, depends upon the longitudinal line it is located on. Thus if there be four characters on the same transverse line, but upon say, the fourth, sixth, tenth and sixteenth longitudinal lines these like characters will all be selected at one time, as the circuits are all closed at once, but they will be selected from the fourth, sixth, tenth, and sixteenth type rings and the characters will occupy those relative positions in the line of composition.

Thus far I have described only the mechanism for perforating the paper in this peculiar manner, but it is also the object of my invention to provide means for feeding the paper, economizing in the use of the same; and also for returning all the parts to their normal position after each line has been perforated. In order to accomplish these objects, I journal a horizontal shaft 2 longitudinally of the frame some distance above the punch carrying bar, and project the rear end of this shaft some distance through the rear end of frame, as shown in Fig. 1. A cylinder 3 is rigidly mounted upon the shaft 2 within the frame, the entire curved surface of said cylinder having a series of inclined projections, 4, (Fig. 2) produced thereon, said projections being arranged longitudinally. The cylinder thus constructed is virtually a ratchet surfaced cylinder. Surrounding this ratchet faced cylinder, is a series of rings 5, (Figs. 1 and 2) there being as many rings as there are keys and punches, said rings being arranged side by side and extending from one end of the cylinder to the other. A small recess is produced in the inner face of each ring, and within said recess is pivoted a pawl 6, which is adapted to engage the ratchet faced cylinder at a definite time, as will appear farther on. Annular semi-circular grooves 5', (Figs. 1 and 2) are produced in the outer faces of the rings, and within each groove rests a separate cord or wire 12, (Fig. 2) which passes entirely around the ring, one end of said cord or wire being fastened to its respective ring at 14, while the other end, after passing around the ring, is carried outside the frame and secured to the free end of a spring rod 13. This produces a tension upon each ring, and tends to move the same in the direction indicated by the arrow a in Fig. 2. To prevent the ring from so moving until desired, I provide a nose or dog 10', (Fig. 2) upon the outer surface of each ring and as each ring is arranged over a definite punch lever, I attach a stop pin or block 10, (Fig. 2) upon the upper edge of each punch lever near the center of the same, so that while the punch lever is held elevated and out of operation, the nose or dog 10' engages the stop 10 and the ring 5 is thus secured against rotation about the cylinder. The moment a key is pressed and a punch lever moved down, the nose 10' escapes from the stop 10, and the force of the spring rod 13 causes the ring to move as indicated by arrow $a$, the cord 12 being unwound as the ring revolves.

By reference to Fig. 2 it will be seen that the pawl 6 travels around the ratchet faced cylinder without engaging the same, and the rings would revolve entirely around said cylinder unless stopped at some definite point. In practice I limit the movements of these rings by means of a curved gage or regulating plate 39, which surrounds the cylinder 3 and rings 5, and while the cylinder and rings are free to revolve within the curved plate 39, said plate rests sufficiently near to the rings to be engaged by the nose 10', as the ring revolves and thus checks the movement of said ring.

In order to economize in the use of paper to be fed to the machine, I form the edge of the gage plate 39 into a series of steps 40, said steps being graduated according to a definite plan, and the entire plate 39 is so arranged that the rings at the rear end of the machine are checked first, or move the shortest distance around the cylinder. This is because they are connected with the keys which are most frequently used, while the rings at the forward portion of machine or those least frequently used, travel nearly around the cylinder 3 before they are checked.

An essentially rectangular shifting frame 42 is connected with the shaft 2, and rests upon the exterior of the curved check or gage plate 39, said shifting frame being operated by means of a hand crank 41, mounted upon the forward end of shaft 2. The shifting frame 42 is moved by said crank in the direction of arrow $b$ (Fig. 2) and as it so moves comes in contact with the noses 10' which are resting against their respective steps or notches 40, it being understood that each step or notch is arranged opposite one particular ring 5. The continued movement of the frame 42 shifts the rings back to their original position so that the pins 10 engage the noses 10' and as the rings are shifted, their pawls 6 engage the ratchet surface 4, at the point where said rings were checked, and the cylinder is thus moved around in the direction of arrow $c$ a distance equal to the distance the foremost ring operated has traveled.

A gear wheel 45 is loosely mounted upon the rear portion of shaft 2 adjacent to the frame, and between the frame and wheel 45, an arm 44 is rigidly secured to the frame 42, and is adapted to engage a pin 46 upon the inner face of said gear. An idler wheel 50 is journaled to end of frame and meshes with the gear 45, and also with a gear 49 mounted upon the rear end of a shaft 47, journaled to one side of the frame in brackets secured to said frame. A bevel gear 48 is mounted upon the forward end of the shaft 47, and meshes with the gear 21 on the outer end of shaft 20, (Fig. 3.) A gear wheel 56 is rigidly mounted upon the rear end of the shaft 2, said gear meshing with a combined straight and bevel gear 57, the bevel portion of which meshes with a bevel gear 58, mounted upon one end of a shaft 59, journaled at the rear end of frame, and upon this shaft 59 is mounted the upper paper feeding roll, 53. The lower paper feeding roll, 54, is journaled directly beneath the roll 53, said rolls being of the same diameter. A pinion 60' is mounted upon the end of shaft 59, and meshes with a pinion 60 mounted on the shaft of roll 54, and by this means the two rolls are driven simultaneously in opposite directions. A bevel gear 61 is also mounted upon the end of shaft 59, said gear meshing with a bevel gear 62, mounted upon the end of shaft 63, journaled upon the side of frame opposite the shaft 47, (Fig. 3.) The opposite end of the shaft 63 is also provided with a bevel gear 62 which meshes with a similar gear 61 mounted upon the end of upper feed roll, journaled at the front of machine. The rolls at the forward end are the same size as those at the rear end and are similarly connected and operated, and it will be seen that all the rolls will be operated at one and the same time. Now as each key is depressed the punch carrying bar is moved across the machine in consequence of the spring in the case of pinion 22' unwinding, and driving the pinion 22. The gear 21 is also operated transmitting power to the shaft 47 and gear 49, which meshing with idler 50, drives the gear 45, which turns loosely on the shaft 2, the pin 46 moving away from the arm 44. During these various operations the rings 5 have been moving around the cylinder until checked by plate 39, but the paper feeding rolls have remained stationary. When the line of composition has been perforated, and it is desired to bring the punch carrying bar back ready for another line, also the rings, &c., and at the same time feed the perforated strip from the machine, I operate the shifting frame 42 by means of crank 41, and this picks up the rings and shifts them to their normal position, it being understood that the foremost ring is the ring which travels the farthest and is the first one to be picked up, and it will be this ring which will first engage the cylinder, operate the same, and likewise the shaft 2. In this manner all the rings will be returned to their proper positions and at the same time, the arm 44 on frame 42 will move around and engage the pin 46 on gear 45, and move said gear back exactly the distance it has traveled, and as this motion is transmitted to shaft 47, the shaft 20 will also be reversed and turned as many times as before, in this way bringing the bar back to its original position and restoring the power of the case spring. When the foremost ring engages the cylinder and moves the same, the gear 56 is moved, and continues to move until the rings have been shifted to their normal positions, but no longer, and by this means the rear feed rolls are operated and at the same time the forward feed rolls, and it will be seen that as the rolls only operate while the rings are being returned, the paper fed from the machine will only be such length as has been perforated, thereby economizing in the use of paper.

When the paper is placed upon the paper reeling device of the matrix making machine, it is likewise an object to prevent undue reeling of said paper after the line of composition has been reeled, and in order to do this, a supplemental needle is employed upon the reeling device, to operate a spring check, and to permit said needle to make a circuit, a supplemental perforation is made in the margin of the paper at the end of the line as shown at $d$, Fig. 12. For the purpose of producing this supplemental perforation, I provide a supplemental punch bar 64 near the left hand side of frame and within the same. This bar 64 carries two punches, 65 and 65' (Fig. 2) and above these punches revolve the wiper wheels, 66, each wheel being adapted to engage one of the punches. These wheels 66 are mounted upon a shaft 67, which shaft carries a cam grooved drum 68, between the wheels 66 and the side of case. The drum is also greater in diameter than the wheels. A laterally projecting finger 70, (Fig. 2) is attached to the left hand side of punch bar 15, and enters the cam groove in the drum 68 at the end of its forward movement thus moving said drum, operating the wiper wheels, and producing a single perforation, which always occurs at the end of the line of composition, and the wiper wheels are so constructed that only one operates at a time, and the groove in the drum is so formed that the pendent end 69 of the finger 70 can always enter the same.

$68^2$ is a spring, closing the exit of the straight groove in the drum 68, to guide the finger 70 into the oblique groove, upon each forward movement of said finger.

Figure 8:
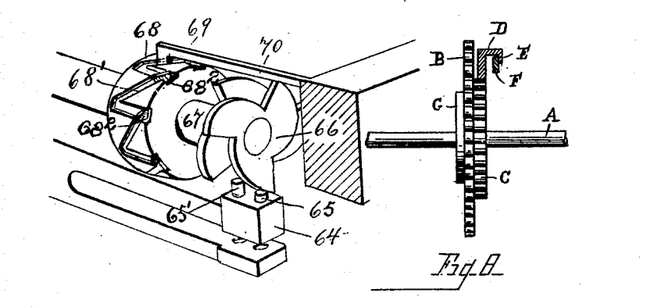
Fig. 8, is a section on the line $y-y$ of Fig. 7.
Figure 9:
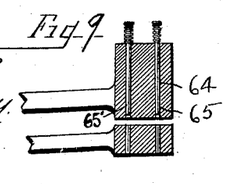
Fig. 9, is a detail sectional view of the supplemental punch bar.

I also find it necessary in preparing the strip of paper to hyphen the words at the end of line, and for the purpose of properly doing this, I provide a registering device in connection with the machine which indicates accurately the exact position of the punch bar at any time. In constructing this registering device I employ a horizontal shaft A, (Figs. 7 and 8) at the forward end of machine, and loosely mount thereon a ratchet wheel B, having a pinion C integral therewith, said pinion meshing with a rack bar D, carrying a pointer E, which moves along the indicator plate F. A convolute spring G, is wound around the shaft A, one end of the spring being attached to said shaft, while the opposite end is attached to the ratchet wheel B. H. H. indicate rods attached at their outer ends to the cross bar 31, the inner ends of said rods carrying spring pawls K. K., which engage the ratchet wheel B upon opposite sides. By this construction, when a key is depressed, and a perforation made, the ratchet wheel will be moved one notch, also the pinion, and likewise the rack bar. The spring is coiled up by these operations, and power stored therein. A lever P is pivoted on the shaft A and connects the two rods H. H., near their inner ends for the purpose of throwing them out of engagement with the ratchet B, when the punch bar is returned to its original position. To trip the lever P, I employ a rod O which connects with a lever M, the lower end of said lever projecting in the path of a tripping pawl L, pivoted upon a projection formed on the punch carrying bar 15. The pawl L, is formed with a projection L' and is so pivoted that in moving forward it passes beneath the end of lever M, without tripping the same, but in moving backward it trips the lever, throws the rod H. H out of engagement with B and the recoil of the spring G returns the rack bar to its original position. Thus it will be seen that I provide a registering device, and also construct the same in such a manner that it is returned to its original position. At the same time, the other parts of the machine are returned to their original positions.

The operation of the various details, and also the function of each element having been fully set forth in the description of the machine, I will now briefly state the operation of the complete machine. The paper 55 is first inserted into the machine, and to do this, I press upon the foremost key and thus release the foremost ring 5. The lever 41 is then operated to shift the ring back to its original position, and at the same time the punch bar is moved back one space, and the paper feed rolls revolve long enough to feed an entire length of a line of composition into the machine. The paper being now in position between the sections 15 and 19 of the punch bar, remains stationary while a line of composition is being perforated. The necessary keys 8 are then depressed in their proper relative order, and as each key is depressed, the punch lever 7 strikes the punches 17 which perforate the paper. When pressure is removed, the lever 7 springs up and also the punches 17, and when the lever 7 is forced down the head 32 rides on the bar 31, moving bars 28 and 30 outward, and also the rods 33. This withdraws the blocks 34 from the arms 35, and as soon as the lever 7 is raised, the springs $33^a$ force the rods 33 inward, bringing the block 34 against the arms 35, rocking the shaft 25, releasing pawl 26, and permitting the shaft 20 to turn by power of pinion 22' enough to feed the traveler nut 24 and punch bar to the next longitudinal line $c$ on the paper, ready to receive the next perforation. This may be either a similar character or a different one and if it be a like character, it will be made upon the same transverse line $b$ but upon a different longitudinal line $c$ whereas if they be unlike characters, they will be made upon different transverse lines as clearly shown in Fig. 12. When a punch lever is pressed down it releases its respective ring 5, which travels around the cylinder until checked by the gage plate 39. The operations are continued until a line has been completed, and by this time the finger 70 is in engagement with the cam grooved drum 68, operating the same, and producing the supplemental perforation d. The pawl L has also passed beneath the end of lever M, and the indicator tells that the limit has been reached. The operations are now stopped, and the crank 41 given a turn. This shifts all the rings back to their original positions and also turns the cylinder which revolves the shaft 2. This shaft 2 drives the feed rolls 53 and 54 through the gears 56, 57, 58, 60, &c., and at the same time the paper is fed out, the punch bar is brought back to its original position by means of the gear 45, idler 50, gears 48, 49, 21, and 22, and the power is restored to the pinion 22′. The cylinder only revolves the distance the forward ring has traveled. Therefore only that amount of paper is fed from the machine which has been perforated, thereby economizing in the use of such paper. When the punch bar is returned, it is moved back exactly the distance it has traveled forward, and the spring in the case of pinion 22′ is wound up ready for action again. The pawl L also trips the lever M, which releases the rods H H, and thus permits the rack bar to be returned ready to start another line. It will thus be seen that I provide a machine which quickly and accurately perforates a strip of paper in the definite manner described, economizes in paper, and simultaneously returns all the parts to their normal positions.

Having thus described my invention, what I claim is—

1. In a perforator, a transversely movable punch carrying bar, having a series of punches, and a series of punch levers adapted to operate the punches, and devices for moving a strip of paper longitudinally through the punch bar.

2. In a perforator, keys carrying type symbols, a transversely movable punch carrying bar made in two sections and having a series of punches, punch levers connected to the keys, and adapted to operate the punches, and an intermittently revolving shaft adapted to move the punch carrying bar transversely.

3. In a perforator, the combination with the paper feeding rolls, of a transversely movable punch carrying bar, a series of punches arranged therein, the punch levers for operating the punches, and a supplemental punch bar and punches arranged at one side of the frame and means for operating the said supplemental punches at the end of the transverse movement of the main punch bar.

4. In a perforator, the combination with a punch carrying bar, transversely movable within the frame, of a series of punches arranged therein and the levers for operating the punches the paper feeding rolls, and means for simultaneously reversing the movement of the punch carrying bar, and operating the feed rolls, whereby the parts are returned to their normal positions as the perforated strip is fed from the machine.

5. In a perforator, the combination with a punch carrying bar having a series of punches and levers for operating the punches of a spring actuated, intermittently revolving threaded shaft, adapted to move the bar transversely, a checking device for holding the shaft stationary, and a tripping device for releasing the check and permitting the shaft to revolve a definite distance.

6. In a perforator, the combination with a punch carrying bar, having a series of punches and levers for operating the punches, of a spring actuated threaded shaft adapted to move the bar transversely after each perforation, a checking device for holding the shaft stationary, tripping devices for releasing the shaft and rods connected with said tripping devices, and operated by the punch operating levers.

7. In a perforator, the combination with a punch carrying bar having a series of punches and levers for operating the punches, of a threaded shaft, for intermittently feeding the bar transversely, a checking device for normally holding the shaft, a tripping device releasing the check and the revoluble shaft and gears arranged at the side of frame for reversing the motion of the threaded shaft and returning the punch bar to its original position.

8. In a perforator, the combination with a punch carrying bar having a series of punches and levers for operating the same, of the spring actuated threaded shaft, carrying a traveler nut rigidly secured to the punch carrying bar, the ratchet disk, the rock shaft having pendent arms, the checking pawl carried by the rock shaft the transversely movable rods carrying tripping blocks, and the bars connected to said rods and operated by the punch levers, and the revolving shaft and gears arranged at the side of the frame for reversing the motion of the threaded shaft, and returning the punch bar to its original position.

9. In a perforator, the combination with a punch carrying bar, having a series of punches and levers for operating the punches, of a threaded feed shaft for operating the punch bar, a cylinder mounted upon a shaft journaled above the punch bar, a series of revolvable rings adapted to engage said cylinder, a shifting frame, the paper carrying rolls, gears connecting the cylinder shaft with said rolls, whereby when the rings are shifted and engage the cylinder the feed rolls will be revolved to feed the paper.

10. In a perforator, the combination with a punch carrying bar having a series of punches and levers for operating the punches, of the threaded feed shaft, a cylinder mounted upon a shaft above the punch bar, a series of rings arranged about said cylinder, and adapted to engage the same at definite points, the shifting frame, gearing arranged at the side and end of the frame and connected with the feed shaft, a gear journaled upon cylinder shaft, operated by the shifting frame and operating the gearing connected with the feed shaft, whereby as the rings on the cylinder are shifted, the feed shaft is reversed and the punch carrying bar brought back to its original position.

11. In a perforator, the combination with a punch carrying bar having a series of punches of levers for operating the punches, said levers having stop pins, the cylinder mounted upon a shaft above the punch bar, and having a ratchet face, a series of rings arranged upon said cylinder, and having pawls on their inner side, and noses on their outer side which engage the stop pins, the cords around the rings and springs connected therewith, and the gage plate for checking the rings at points when they engage the cylinder, a shifting frame for returning the same to their normal positions, the feed rolls and the gearing connecting the cylinder with the feed rolls.

12. In a perforator, the combination with the punch bar, and a series of punches arranged therein, of the levers the rings, cylinder and gage plate, the shifting frame, the feed rolls and gearing connecting the cylinder shaft and feed rolls, the feed shaft for punch bar, and gearing devices for connecting the feed shaft and shifting frame, whereby the paper is fed simultaneously as the punch bar and rings are returned.

13. In a perforator, the combination with the transversely movable punch bar and levers of a series of punches carried by the bar the cylinder, rings, and gage plate, feed rolls, and gearing connecting the feed rolls with the cylinder the shifting frame, the feed shaft and gearing connecting the feed shaft and shifting frame, and the supplemental perforator arranged to one side of frame and means for operating the said supplemental punch at the end of the transverse movement of the main punch bar.

14. In a perforator, the combination with a punch bar having a series of punches of the levers a registering device arranged near the forward end of the frame, and provided with a ratchet disk bars attached to side of frame operated by each punch lever, and rods connecting the registering device with said bars, said rods having spring pawls adapted to engage the ratchet disk whereby the register is operated after each punch has been operated.

15. In a perforator, the combination with a punch bar composed of the upper and lower sections, and carrying a series of punches in the upper section, of the slide rods upon which said sections are mounted, said rods sliding transversely in the frame and connected to each other outside of the frame to move the sections in unison, the paper feeding rolls, and means for operating the same, whereby a strip of paper may be moved longitudinally between the sections of the punch bar and the slide rods.

In testimony that I claim the foregoing as my own I hereby affix my signature in presence of two witnesses.

ERLE V. BEALS.

Witnesses:
WILLIAM WEBSTER,
CARROLL J. WEBSTER.